United States Patent
Suzuki et al.

(10) Patent No.: US 10,227,699 B2
(45) Date of Patent: Mar. 12, 2019

(54) ANODE FOR PREVENTING CORROSION, AND CONCRETE STRUCTURE CORROSION PREVENTION STRUCTURE AND CORROSION PREVENTION METHOD EMPLOYING SAME

(71) Applicants: Fujimori Kogyo Co., Ltd., Tokyo (JP); Sho-Bond Corporation, Tokyo (JP)

(72) Inventors: Jun Suzuki, Yokohama (JP); Yasuto Ishikawa, Yokohama (JP); Hirokazu Iizuka, Kawasaki (JP); Tsutomu Nakamura, Sagamihara (JP); Norimasa Mimura, Tsukuba (JP); Yuichi Futaki, Nagareyama (JP)

(73) Assignees: Fujimori Kogyo Co., Ltd. (JP); Sho-Bond Corporation (JP)

( * ) Notice: Subject to any disclaimer, the term of this patent is extended or adjusted under 35 U.S.C. 154(b) by 116 days.

(21) Appl. No.: 15/300,177

(22) PCT Filed: Mar. 31, 2015

(86) PCT No.: PCT/JP2015/060138
§ 371 (c)(1),
(2) Date: Sep. 28, 2016

(87) PCT Pub. No.: WO2015/152247
PCT Pub. Date: Oct. 8, 2015

(65) Prior Publication Data
US 2017/0130341 A1    May 11, 2017

(30) Foreign Application Priority Data

Mar. 31, 2014   (JP) .................................. 2014-071412

(51) Int. Cl.
*C23F 13/02*   (2006.01)
*C23F 13/16*   (2006.01)
(Continued)

(52) U.S. Cl.
CPC .............. *C23F 13/16* (2013.01); *B32B 3/266* (2013.01); *B32B 5/02* (2013.01); *B32B 5/022* (2013.01);
(Continued)

(58) Field of Classification Search
CPC .......... C23F 13/02; C23F 13/06; C23F 13/08; C23F 13/10; C23F 13/12; C23F 13/14; C23F 13/16; C23F 13/18; C23F 2201/02
See application file for complete search history.

(56) References Cited

U.S. PATENT DOCUMENTS

| 4,812,212 A | 3/1989 | Dimond et al. |
| 9,315,906 B2 * | 4/2016 | Ishikawa ................. C23F 13/06 |

(Continued)

FOREIGN PATENT DOCUMENTS

| CN | 1867700 A | 11/2006 |
| GB | 2194903 A  * | 3/1988 .............. C23F 13/02 |

(Continued)

OTHER PUBLICATIONS

HyperPhysics ("Resistivity and Temperature Coefficient at 20 C", 2001). (Year: 2001).*

(Continued)

*Primary Examiner* — Alexander W Keeling
(74) *Attorney, Agent, or Firm* — St. Onge Steward Johnston & Reens, LLC

(57) ABSTRACT

A corrosion protection anode using an external power supply in which a reinforcing layer formed of a fiber base material is laminated with an adhesive layer on one surface of a conductive layer formed of a graphite sheet, and an electrolyte layer of an electrolyte-containing resin formed in a sheet shape and having adhesive power such that the layer is capable of being adhered to the conductive layer and to a surface layer of an object to be protected from corrosion is (Continued)

adhered by the adhesive power thereof to the other surface of the conductive layer, wherein the conductive layer always has a resistance value of 4 Ω or less between any two points on the surface thereof on a side that comes into contact with the electrolyte layer.

7 Claims, 3 Drawing Sheets

(51) Int. Cl.
  *C23F 13/06* (2006.01)
  *C23F 13/08* (2006.01)
  *B32B 5/02* (2006.01)
  *B32B 7/06* (2019.01)
  *B32B 7/12* (2006.01)
  *B32B 13/04* (2006.01)
  *B32B 13/12* (2006.01)
  *B32B 27/06* (2006.01)
  *B32B 27/12* (2006.01)
  *B32B 3/26* (2006.01)
(52) U.S. Cl.
  CPC ............... *B32B 7/06* (2013.01); *B32B 7/12* (2013.01); *B32B 13/04* (2013.01); *B32B 13/12* (2013.01); *B32B 27/06* (2013.01); *B32B 27/12* (2013.01); *C23F 13/02* (2013.01); *C23F 13/06* (2013.01); *C23F 13/08* (2013.01); *B32B 2250/44* (2013.01); *B32B 2255/10* (2013.01); *B32B 2255/26* (2013.01); *B32B 2260/021* (2013.01); *B32B 2260/046* (2013.01); *B32B 2262/0253* (2013.01); *B32B 2262/106* (2013.01); *B32B 2307/202* (2013.01); *B32B 2307/714* (2013.01); *B32B 2307/724* (2013.01); *B32B 2307/7242* (2013.01); *B32B 2307/748* (2013.01); *B32B 2307/752* (2013.01); *B32B 2457/18* (2013.01); *B32B 2571/00* (2013.01); *C23F 2201/02* (2013.01); *C23F 2213/22* (2013.01)

(56) References Cited

U.S. PATENT DOCUMENTS

| | | |
|---|---|---|
| 2013/0015058 A1 | 1/2013 | Tarrant |
| 2014/0224670 A1 | 8/2014 | Ishikawa et al. |

FOREIGN PATENT DOCUMENTS

| | | | |
|---|---|---|---|
| JP | 6050461 U | 4/1985 | |
| JP | 63-184567 U | 11/1988 | |
| JP | 05-077863 U | 10/1993 | |
| JP | 6136572 A | 5/1994 | |
| JP | 2002220685 A | 8/2002 | |
| JP | 2004190119 A | 7/2004 | |
| TW | 201319367 A1 | 5/2013 | |
| WO | 2012008591 A1 | 1/2012 | |
| WO | 2013031663 A1 | 3/2013 | |
| WO | WO-2013031663 A1 * | 3/2013 | .............. C23F 13/06 |

OTHER PUBLICATIONS

Office Action issued in Japan Application No. 2014-071412 dated Jul. 18, 2017 14 pages
Type of Office Action: Search Report Country: EP Application No. 15774117.4 dated Dec. 8, 2017 8 pages.
International Search Report Application No. PCT/JP2015/060138 dated Jun. 16, 2015 4 pages.
Type of Office Action: Office Action Country: CN Application No. 201580017016.6 dated Feb. 24, 2018 8 pages.

* cited by examiner

ANODE FOR PREVENTING CORROSION, AND CONCRETE STRUCTURE CORROSION PREVENTION STRUCTURE AND CORROSION PREVENTION METHOD EMPLOYING SAME

FIELD OF THE INVENTION

The present invention relates to a corrosion protection anode used in protecting a reinforcing bar and the like covered by a concrete layer from corrosion, a concrete structure corrosion protection structure and a concrete structure corrosion protection method employing the same. Priority is claimed on Japanese Patent Application No. 2014-071412, filed Mar. 31, 2014, the content of which is incorporated herein by reference.

BACKGROUND OF THE INVENTION

Cathodic protection in which a potential of a steel material such as a reinforcing bar in concrete is dropped to a potential at which corrosion does not occur by flowing a current through the steel material from an electrode (anode) installed near a surface of the concrete to inhibit progress of corrosion of the steel material is known. An external power supply method and a galvanic anode are known for such cathodic protection.

The external power supply method is anode corrosion protection in which a positive electrode of a direct current power supply is connected to a corrosion protection anode via a conductor and a negative electrode of the direct current power supply is connected to a steel material of an object to be protected from corrosion via a conductor to form an electric circuit so that a corrosion protection current flows through the electric circuit from the corrosion protection anode to the steel material.

In the external power supply method, a corrosion protection anode with high corrosion resistance such as titanium mesh, a titanium grid, and a titanium rod is installed at a surface of concrete directly or through a groove or a hole provided at the surface and is fixed with mortar. In this aspect, there are problems in that it is disadvantageous in terms of the cost due to the high price of the anode with high corrosion resistance and the construction thereof requires a significant amount of labor.

Meanwhile, a method in which platinum-coated titanium lines are installed at predetermined intervals on a concrete surface and the whole concrete surface is coated with a conductive coating material is being developed. However, in this method, potential distribution becomes non-uniform according to a state of a contact surface between the conductive coating film and the concrete, and thus there is a problem in that the conductive coating film is prone to degradation and separation due to an electrochemical reaction.

With respect to the problems above, in Japanese Unexamined Patent Application, First Publication No. 2004-190119, a corrosion protection method in which a carbon fiber sheet coated with an oxidation-resistant metal having a passive film is used for reinforcing a concrete structure, and a filling material layer of a cement base that includes a passive protectant for inhibiting breakdown of the passive film and an electrolyte is provided on a surface of the concrete structure so that conduction occurs at the carbon fiber sheet is proposed.

However, in this method, a masking tape is attached and an adhesive is applied in a stripe pattern to a spot at which the filling material layer will be installed on the surface of the concrete structure. Then, the masking tape is peeled off, and the carbon fiber sheet is attached. After the carbon fiber sheet is attached, two tubular bodies are made to pass through the spot at which the filling material layer will be installed such that air is discharged through one of the two tubular bodies and the filling material is injected between the carbon fiber sheet and the surface of the concrete structure through the other of the two tubular bodies. Then, an impregnating adhesive is impregnated from an upper portion of the carbon fiber sheet.

In this case, the work of providing the adhesive layer and the filling material layer in the stripe pattern becomes laborious because the work is required to be performed overhead at a site of the corrosion protection work in which a treatment is performed at a back surface of a structure such as a floor slab of a bridge in many cases.

To lighten anode installation work at a site, in PCT International Publication No. 2013/031663 WO, a supplementary anode is proposed. In the supplementary anode, an electrolyte layer formed in a sheet shape and having adhesive power such that the electrolyte layer is capable of adhering to the conductive layer and to the surface layer of the object to be protected from corrosion is adhered to one surface of the conductive layer on which a carbon material is formed in a sheet shape.

In the proposal of PCT International Publication No. 2013/031663 WO, the anode is manufactured in a factory, and the carbon material formed in a sheet shape is only adhered to the electrolyte layer on the surface of the concrete to install the anode at the site. Because of this, it is very easy to install an anode.

In addition, since the electrolyte is adhered to the whole concrete surface of a portion targeted for corrosion protection, a charge transfer is very efficiently performed compared to a case in which the filling material layer of the cement base is provided in the stripe pattern. Also, since an anode surface is not coated with an oxidation-resistant metal, it is advantageous in terms of the cost, and breakdown of a passive film does not occur.

SUMMARY OF THE INVENTION

In the proposal of PCT International Publication No. 2013/031663 WO, it is easy to install an anode and a charge transfer efficiency is high. However, since electrical resistance of the carbon material is higher than that of the metal, a conduction state within the anode surface may not be uniform when conduction occurs in some cases. When the conduction state within the anode surface is not uniform, a conducted voltage may be suppressed to be low, and it may be difficult to perform cathodic protection in which a small amount of gas is generated by electrolysis of water or a chlorine compound. Consequently, it is preferable that an electricity feeding material be attached along the conductive layer in the longitudinal direction so that a difference in a conduction state is small between parts distant from and close to a current discharge point (a positive electrode connection part of the external power supply).

However, even though a significant amount of labor of installing the electricity feeding material improves compared to the method of Japanese Unexamined Patent Application, First Publication No. 2004-190119, a significant amount of labor of manufacturing an anode in a factory is required. Because of this, installation of the electricity feeding material is preferably omitted if possible.

The present invention has been devised in view of the above circumstances, and one of the objects of the present invention is to reduce an amount of work at a construction site as much as possible.

In addition, one of the objects of the present invention is to minimize a difference in a conduction state between parts distant from and close to a current discharge point of the conductive layer even when the electricity feeding material is not used. In this way, the present invention provides a corrosion protection anode in which a conducted voltage is suppressed to be low such that a small amount of gas is generated by electrolysis of water or a chlorine compound and cathodic protection is possible for a long period, and a concrete structure corrosion protection structure and corrosion protection method employing the same.

To solve the problems above, the inventors of the present invention have closely examined a corrosion protection anode in which a conduction state of a concrete surface when cathodic protection is performed is uniform and which is efficiently transformed by a transfer of cations in the concrete even when the electricity feeding material is not used. As a result, the present invention has been completed by finding methods of using an electrolyte layer formed in a sheet shape and having adhesive power such that the electrolyte layer is capable of adhering to a concrete surface and properly using a conductive layer formed of a graphite sheet prone to breakage.

The present invention provides a corrosion protection anode as below.

A first aspect of the present invention is a corrosion protection anode, by means of an external power supply in which a reinforcing layer formed of a fiber base material is laminated by an adhesive layer to one surface of a conductive layer formed of a graphite sheet, and an electrolyte layer of an electrolyte-containing resin formed in the shape of a sheet and having adhesive power such that the layer is capable of being adhered to the conductive layer and to a surface layer of an object to be protected from corrosion is adhered by the adhesive power thereof to the other surface of the conductive layer, wherein the conductive layer always has a resistance value of 4Ω or less between any two points on the surface thereof on a side that comes into contact with the electrolyte layer.

A second aspect of the present invention is a corrosion protection anode according to the first aspect in which the conductive layer has a plurality of through-holes through which gas is permeable.

A third aspect of the present invention is a corrosion protection anode according to the first aspect or the second aspect in which an outer surface of the reinforcing layer is covered with an impermeable protective layer.

A fourth aspect of the present invention is a corrosion protection anode according to any one of the first aspect to the third aspect in which an outer surface of the electrolyte layer is covered with an impermeable release paper.

In addition, the present invention provides a concrete structure corrosion protection structure and a concrete structure corrosion protection method as below.

A fifth aspect of the present invention is a concrete structure corrosion protection structure in which a corrosion protection anode according to any one of the first aspect to the fourth aspect is adhered to a surface of a concrete structure using the electrolyte layer, the conductive layer of the corrosion protection anode is connected to a positive electrode of an external power supply, and a negative electrode of the external power supply is connected to an object to be protected from corrosion.

A sixth aspect of the present invention is a concrete structure corrosion protection structure according to the fifth aspect in which metal teeth of a terminal having the metal teeth are configured to cut into at least both of the conductive layer and the reinforcing layer such that the conductive layer is connected to the positive electrode of the external power supply.

A seventh aspect of the present invention is a concrete structure corrosion protection method in which the concrete structure corrosion protection structure according to the fifth aspect or the sixth aspect is used to apply a voltage between the conductive layer of the corrosion protection anode and the object to be protected from corrosion and flow a corrosion protection current.

According to the corrosion protection anode of the first aspect of the present invention, a conductive layer formed of a graphite sheet in which volume resistivity in a horizontal direction (a direction along a surface) is considerably lower than the volume resistivity in a vertical direction (a direction passing through the layer) is used such that the resistance value between any two points on the conductive layer is always 4Ω or less.

In addition, even when the resistance value in the horizontal direction is low and a current discharge point is provided at a corner portion, the conductive layer in which the difference is small between resistance values of portions close to and distant from the current discharge point and a gel electrolyte formed in a sheet shape are uniformly adhered to each other throughout a wide area, Because of this, even when an electricity feeding material is not used, the potential distribution on the surface layer of the object to be protected from corrosion becomes uniform.

Since providing the electricity feeding material is not required, it becomes easy to manufacture an anode. Because of this, a problem in which a conductive layer near the electricity feeding material may be degraded when conduction occurs for a long period may also be solved.

The conductive layer formed of a graphite sheet has high resistance (corrosion resistance) to gases such as oxygen or chlorine generated during conduction and an electrolytic solution. Also, since graphite is used as the conductive layer of the anode, it is advantageous in terms of cost compared to a case in which an expensive metal with high corrosion resistance such as titanium is used in the anode. In addition, since the graphite sheet is lighter than the metal, the weight of the anode may be lightened.

In addition, the electrolyte layer may be adhered to the conductive layer, and the anode may be adhered to the surface layer of the object to be protected from corrosion using a surface to which the conductive layer of the electrolyte layer is not adhered. Consequently, the lighter weight of the anode can also considerably reduce an amount of work at a site for installing a corrosion protection anode.

Since a charge transfer from the external power supply is efficiently transformed to ionic conduction of the electrolyte due to a larger amount of ions in the electrolyte than in concrete, electrochemical polarization may be lowered. As a result, since a voltage applied to the corrosion protection anode can be set to be low, generation of gases caused by electrolysis of water or a chlorine compound may be reduced.

Consequently, the corrosion protection anode of the present invention can obtain a corrosion protection effect even with a small voltage applied thereto. Because of this, corrosion protection is possible using an independent power supply such as a solar cell, a fuel cell, and a battery even without using a commercial power supply that requires a power supply device which is expensive and is complicated to install.

According to the corrosion protection anode of the second aspect of the present invention, in addition to the effect of the corrosion protection anode according to the first aspect, since the conductive layer has a plurality of through-holes through which gas can permeate, gas generated at an interface with the electrolyte layer can be discharged when corrosion protection is performed by flowing a large current. Thus, the conductive layer can be prevented from being partially separated from the electrolyte layer. Consequently, for a reinforcing bar in which corrosion is in progress, after a voltage in which a large current flows is applied to inhibit corrosion and a passive film is formed in a first step, a voltage in which an amount of gas generated due to electrolysis of water or an electrolyte is small can be applied to perform corrosion protection in a second step.

According to the corrosion protection anode of the third aspect of the present invention, in addition to the effect of the corrosion protection anode according to the first aspect or the second aspect, physical damage and contamination of the reinforcing layer, the conductive layer, and the electrolyte layer and intrusion of rainwater or floating salt thereto can be prevented without lowering handleability and constructability of the corrosion protection anode.

According to the corrosion protection anode of the fourth aspect of the present invention, in addition to the effects of the anodes for protecting from corrosion according to the first to third aspects, evaporation of a solvent, physical damage, contamination, and unintended contact with another object of the electrolyte layer can be prevented.

According to the corrosion protection structure of the fifth aspect of the present invention, in addition to effects which are the same as those of the corrosion protection anodes according to the first aspect to the fourth aspect, a concrete structure corrosion protection structure in which construction in corrosion protection work is easy, and the amount of work at a construction site is considerably reduced such that there is no possibility for the corrosion protection anode to flake is obtained.

According to the corrosion protection structure of the sixth aspect of the present invention, in addition to the effect of the corrosion protection structure according to the fifth aspect, a concrete structure corrosion protection structure in which wiring work at a construction site is easy such that there is no possibility of defects in conduction throughout a long period is obtained.

According to a corrosion protection method of the seventh aspect of the present invention, in addition to an effect which is the same as that of the corrosion protection structure according to the fifth aspect or the sixth aspect, a voltage being applied can be suppressed to be low even when a large current is used in corrosion protection such that cathodic protection can be stably performed for a long period.

DETAILED DESCRIPTION OF THE INVENTION

Hereinafter, the present invention will be described based on preferred embodiments with reference to the drawings.

Figure 1:
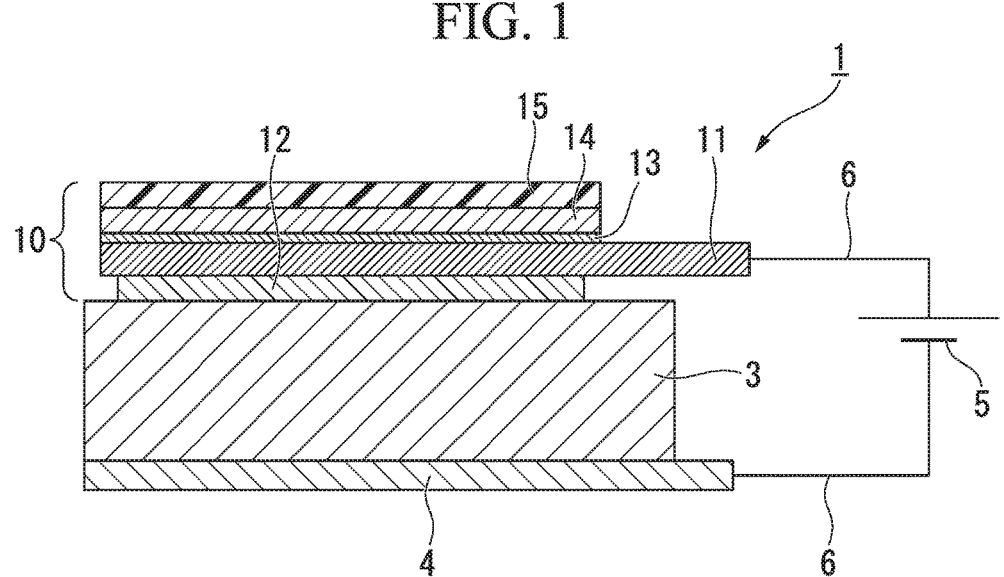
FIG. 1 is a cross-sectional view schematically showing an example of a corrosion protection anode according to the present invention and an example of a concrete structure corrosion protection structure using the same.

FIG. 1 schematically illustrates an example of a corrosion protection anode 10 according to the present invention and an example of a concrete structure corrosion protection structure using the same.

In FIG. 1, reference numerals 1, 3, 4, 5, 6, 10, 11, 12, 13, 14, and 15 refer to a corrosion protection structure of the present invention, a surface layer (concrete layer), an object to be protected from corrosion (a reinforcing bar), an external power supply, a wiring circuit (a wire), a corrosion protection anode of the present invention, a conductive layer, an electrolyte layer, an adhesive layer, a reinforcing layer, and a protective layer, respectively.

In a concrete structure corrosion protection structure 1 using a corrosion protection anode 10 of the present invention, the corrosion protection anode 10 is installed by adhering an electrolyte layer 12 to a surface of a concrete layer 3. Also, a wiring circuit 6 is used to connect a positive electrode of an external power supply 5 to a conductive layer 11 of the corrosion protection anode 10, and the wiring circuit 6 is used to connect a negative electrode of the external power supply 5 to an object to be protected from corrosion 4 to form a corrosion protection circuit.

Further, "adhering" refers to objects being integrated with each other by sticking or bonding. "Sticking" refers to objects being integrated with each other by an adhesive strength in which separation is possible on an intentional interface but is impossible in a natural state. "Bonding" refers to objects being integrated with each other by an adhesive strength in which separation on an interface is impossible.

In the corrosion protection anode 10, a reinforcing layer 14 formed of a fiber base material is laminated on one surface of the conductive layer 11 formed of a graphite sheet using an adhesive layer 13. The electrolyte layer 12 is adhered by adhesive power thereof to the other surface of the conductive layer 11. The electrolyte layer 12 has the adhesive power that allows the electrolyte layer 12 to be adhered to the conductive layer 11 and the surface layer 3 of the object to be protected from corrosion 4.

The conductive layer 11 used in the present invention is a planar electrode that uniformly supplies a current supplied by the external power supply 5 to the surface layer 3 of the object to be protected from corrosion 4 through the electrolyte layer 12.

A resistance value between any two points on the surface that comes into contact with the electrolyte layer 12 (hereinafter, this may be simply referred to as "a resistance value between two points") of the conductive layer 11 is always 4Ω or less.

Carbon includes many allotropes with different structures, and diamond, fullerenes, carbon nanotubes and so on are all carbon. Industrially, graphite is generally used.

Since a graphite sheet has excellent heat resistance, chemical resistance, heat conduction property, and electrical conduction property, it is widely used in heat conductive materials, heat-resistant seal materials, gas diffusion bodies of fuel cells and so on.

In a graphite sheet, volume resistivity in a horizontal direction (a direction along the layer) is considerably lower than volume resistivity in a vertical direction (a direction passing through the layer). In addition, durability (corrosion resistance) against gases such as oxygen or chlorine generated when conduction occurs and an electrolytic solution is high.

In addition, generally, "sheet" refers to a form of a thick film, and "film" refers to a form of a thin film. However, in this specification, "sheet" and "film" are used regardless of a thickness.

As described above, to minimize a difference between conduction states at parts distant from and close to a current discharge point, the conductive layer according to the method described in the example of PCT International Publication No. 2013/031663 WO preferably includes an electricity feeding material provided along a conductive layer in a longitudinal direction.

When an electricity feeding material of a stainless tape is actually provided along the conductive layer in the longitudinal direction using a conductive adhesive, the difference between the conduction states at the parts distant from and close to the current discharge point can be small. The stainless tape used here has a thickness of 30 μm, a width of 4 mm, and a length of 1000 mm. The actual resistance value of the stainless tape is approximately 4Ω, which is unexpectedly large. Consequently, to make the conduction state due to the conductive layer 11 be uniform, the resistance value between two points always has to be 4Ω or less in consideration of contact resistance of a conductive adhesive.

In addition, in the concrete structure corrosion protection structure of the present invention, a surface of the conductive layer 11 that at least comes into contact with the electrolyte layer 12 is preferably connected to the positive electrode of the external power supply 5 since volume resistivity in the vertical direction of the conductive layer 11 does not have to be taken into consideration in this case. Also, since the thickness of the conductive layer 11 is sufficiently smaller than a length of a side thereof, volume resistivity in the vertical direction may be ignored. Thereby, a surface of the conductive layer 11 that comes into contact with the reinforcing layer 14 may also be connected to the positive electrode of the external power supply 5 in the corrosion protection anode 10.

The thickness of the conductive layer 11 is not particularly limited as long as the resistance value between two points is 4Ω or less. When the conductive layer 11 becomes thick, the resistance value between two points decreases, but it becomes disadvantageous in terms of cost. When the conductive layer 11 becomes thin, it becomes advantageous in terms of cost, but the resistance value between two points increases, and there may be cases in which it lacks mechanical strength. Consequently, the thickness of the conductive layer 11 is preferably approximately 0.01 mm to 2 mm.

The graphite sheet used in the conductive layer 11 is preferably manufactured using, for example, the following method.

Natural flaky graphite which is a raw material is subjected to floatation and chemically treated. Then, the natural flaky graphite is acidized by a mixed oxidant of concentrated sulfuric acid and nitric acid, and is subjected to expansion treatment. In the expansion treatment, the natural flaky graphite is rapidly heated to a high temperature close to 1000° C. to expand the apparent thickness of the raw material graphite by a factor of tens to hundreds along in-between portions of the layers. The expanded graphite is compression-molded together with a binder to form a graphite sheet. This method is a manufacturing method referred to as "expanding method." Since the manufacturing cost of the graphite sheet obtained using the method above is low, the graphite sheet is used in a planar heating element, a heat dissipation material, a gasket and so on.

The graphite sheet made using the expanding method is advantageous in terms of cost since the raw material thereof is inexpensive and manufacturing thereof is easy. Since the thickness of the graphite sheet is relatively freely controlled, and the graphite sheet has flexibility.

However, an oxidant is used when the expansion treatment is performed in the expanding method. Even if the oxidant is washed off with water and the like, it is difficult to completely remove the oxidant. Consequently, when the oxidant is used for a long period, the remaining oxidant may gradually exude and may corrode a current discharge terminal connected to the conductive layer 11. To deal with this case, metals such as platinum, gold, silver, copper, titanium, and stainless steel which are not easily oxidized or are not easily corroded even when they are oxidized are preferably used in the current discharge terminal.

In addition, since the binder is used when compressively molding the graphite using the expanding method, contact resistance between flaky graphite pieces is high. Because of this, it is difficult to obtain high electrical conductivity. However, the resistance value between two points required for the conductive layer 11 of the present invention can be easily achieved.

In addition, since coupling between pieces of the flaky graphite is weak, separation between pieces of the flaky graphite may easily occur. Consequently, since one graphite sheet body is damaged or destroyed according to a handling method in some cases, one graphite sheet body needs to be handled carefully.

The graphite sheet used in the conductive layer 11 may also be manufactured using a polymer film thermal decomposition method in which a polymer film is directly carbonized and graphitized to manufacture a graphite sheet.

In the polymer film thermal decomposition method, a condensation-type aromatic polymer film capable of a graphitizing reaction is preferably used as a raw material. Of the condensation-type aromatic polymer films, an aromatic polyimide film is more preferably used.

In graphitization, first, a condensation-type aromatic polymer film is thermally pretreated in an inert gas such as nitrogen or argon to preferably reach the highest temperature in a range of 1000° C. to 1200° C.

After that, in the inert gas, a main heat treatment in which a temperature is raised at a predetermined speed to preferably reach the highest temperature of 2500° C. or higher is performed to manufacture an effervescent sheet.

In addition, rolling is performed using a roller or a press plate to achieve uniformization of film thickness, density, surface state and so on. Thus, a high-quality graphite sheet having the same properties as monocrystalline graphite with sufficient flexibility and stiffness and superior thermal conductivity and electrical conductivity is obtained.

In addition, to obtain a higher quality graphite sheet, preferably, when rolling is performed, steam is sprayed onto a surface of the graphite sheet or a separately manufactured thermally resistant protective sheet formed of graphite is made to overlap the graphite sheet.

The graphite sheet made using the polymer film thermal decomposition method has electrical conductivity as monocrystalline graphite. Compared to the graphite made using the expanding method, the graphite sheet made using the polymer film thermal decomposition method is expensive but has high electrical conductivity, has no problems in terms of separation between pieces of the flaky graphite, oxidants, binders, and so on, and is not prone to bending. In addition, since the graphite sheet made using the polymer film thermal decomposition method has extremely high thermal conductivity, it is used in heat dissipation or heat uniformization of a central processing unit (CPU) or various types of electronic devices.

Although the graphite sheet made using the polymer film thermal decomposition method has superior conductivity and thermal conductivity, the thickness thereof is 1 mm or less in consideration of a thickness of raw material and facilitating a progress of a thermal decomposition reaction in a carbonizing process. Even when the thickness thereof is thin, the graphite sheet made using the polymer film thermal decomposition method may lower the resistance value between two points due to the high conductivity thereof.

The graphite sheet used in the conductive layer 11 may also be manufactured by binding randomly dispersing short carbon fibers via a carbide resin. Although such a graphite sheet is expensive, it has gas permeability in a vertical direction. Because of this, the graphite sheet is used in a gas diffusion body of a fuel cell because it has gas permeability in a vertical direction.

In a method of manufacturing the graphite sheet, a paper making mixture that includes short carbon fibers having an average grain size of 1 to 30 μm and an organic binder such as polyvinyl alcohol is extracted by for example a cylinder paper machine and the like to form a sheet by paper making. The sheet formed by paper making is heated and pressed to manufacture an intermediary body in the shape of a sheet. Then, a resin that is carbonized when heated (e.g., a phenolic resin, an epoxy resin, a furan resin, a melamine resin, pitch and so on) is impregnated into the intermediary body to form a precursor fiber sheet.

In addition, when a temperature of the precursor fiber sheet is raised up to at least 1,200° C. in a heating furnace of an inert atmosphere at a temperature raising speed within a range of 100 to 10,000° C. per minute, and the precursor fiber sheet is heated and pressed to carbonize the impregnated resin, a graphite sheet bound by a carbide of a resin impregnated with a short carbon fiber is obtained.

Carbon fibers based on polyacrylonitrile (PAN), pitch, rayon, and so on may be used as the carbon fiber forming the short carbon fiber. Of the carbon fibers, PAN-based or pitch-based carbon fibers are preferably used in consideration of the fact that a porous carbon sheet with superior mechanical strength, proper flexibility, and superior handleability is obtained.

When the graphite sheet manufactured by the expanding method or the polymer film thermal decomposition method is used as the conductive layer 11 used in the corrosion protection anode 10 of the present invention, it may be difficult for gas to permeate in some cases. However, generally, when a small voltage of 2 V or less is applied during corrosion protection, since an extremely small amount of gas is generated, there is no practical problem even when the gas permeability is low.

In the corrosion protection anode 10 of this embodiment, being advantageous in terms of cost is prioritized. Because of this, the graphite sheet made using the expanding method is used as the conductive layer 11.

The electrolyte layer 12 used in the corrosion protection anode 10 of the present invention is a layer that transfers charge to the surface layer 3 of the object to be protected from corrosion 4 by transforming a transfer of electrons (electronic conduction) from a current supplied to the conductive layer 11 from the positive electrode of the external power supply 5 into ionic conduction. The electrolyte layer 12 is a charge transfer layer in which a resin including ions having positive and negative charges is solidified in a sheet shape. The charges are transferred by a transfer of the ions included in the electrolyte layer 12 or a transfer of the charges between the ions.

The electrolyte layer 12 has adhesive power and is adhered to the conductive layer 11 by the adhesive power. Also, the electrolyte layer 12 is also an adhesive layer that adheres, by the adhesive power thereof, the corrosion protection anode 10 to the ion permeable surface layer 3 on a surface of the object to be protected from corrosion 4 such as a concrete layer or a pigment film.

Examples of a main electrolyte layer used as the electrolyte layer 12 may include a gel electrolyte layer in which an electrolytic solution is held in a resin matrix, an ionic gel layer in which an ionic liquid formed of cations such as imidazolium ions and pyridium ions and anions such as $BF_4^-$ and $PF_6^-$ (organic room temperature molten salts) is held in a resin matrix, and a polymer electrolyte layer such as a true polymer electrolyte in which a lithium salt such as lithium bis(trifluoromethanesulfonyl)imide (LiTFSI) is held in a polyether-based resin.

Of the above, the gel electrolyte layer is preferable because it has high ionic conductivity and is easily given flexibility or viscosity. In the gel electrolyte layer, an electrolyte is gelated (solidified) in the resin matrix by addition of a polymer, addition of an oil gelating agent, polymerization including a multifunctional monomer, a crosslinking reaction of a polymer, and so on.

When the electrolyte layer 12 is a gel electrolyte layer, it is preferable because, when the corrosion protection anode 10 is being adhered to a surface layer, for example, the concrete layer 3, of the object to be protected from corrosion 4, a portion of the electrolyte layer 12 enters fine irregularities of the concrete layer 3 and thus the corrosion protection anode 10 may be adhered to the concrete layer 3 by contact of the electrolyte layer 12 throughout a wide contact area and with high adhesive strength.

Although not particularly limited, the thickness of the gel electrolyte layer used in the electrolyte layer 12 is preferably 0.1 mm to 1 mm. There is no particular problem even when the thickness of the electrolyte layer 12 is thicker than the above range, but it is disadvantageous in terms of cost. When the electrolyte layer 12 is thinner than the range, there are some cases in which it lacks adhesive power. Also, in some cases, charge transfer abilities are lowered when the electrolytic solution in the gel electrolyte layer is absorbed into the concrete layer 3.

The size of the electrolyte layer 12 is preferably the same as that of the conductive layer 11 in view of a charge transfer. Thus, when the electrolyte layer 12 is adhered to the conductive layer 11 while an entire surface of the electrolyte layer 12 accurately overlaps an entire surface of the conductive layer 11, it is preferable since there is no useless side in view of the charge transfer. The size of the electrolyte layer 12 may be larger than that of the conductive layer 11 in view of adhesion and may be smaller than that of the conductive layer 11 in view of work of providing a current discharge point.

The gel electrolyte layer used in the electrolyte layer 12 is a conductive polymer gel electrolyte layer having adhesiveness in which a solvent and an electrolytic salt, and preferably further a wetting agent, are held in a resin matrix in which a cross-linkable monomer is copolymerized with a polymerizable monomer. In the polymer gel electrolyte layer, maintaining a shape is required and thus a solvent and the like which is liquid is held in a three-dimensional network structure of a chain polymer in which chain polymers are physically or chemically coupled to each other. By properly designing the polymer three-dimensional network structure, a flexible frame (resin matrix) of the three-dimensional network structure can be formed.

Since the resin matrix has proper cohesive power and wettability of a surface of an adherend is excellent, a portion in contact with the adherend may approach the molecular level. In addition, since compressive strength and tensile strength are given to gel by the proper cohesive power of the gel electrolyte layer, high adhesiveness is obtained by an intermolecular force.

In the resin matrix of the gel electrolyte layer used in the electrolyte layer 12, to increase the cohesive power, it is preferable that a crosslinking treatment be performed with a crosslinking agent, or a polymerizable monomer and a cross-linkable monomer be polymerized to be cross-linked. The resin matrix in which chain polymers are three-dimensionally cross-linked has an excellent ability to hold a solvent or a wetting agent. Thus, it is possible to hold electrolytic salt in a state in which it is dissolved at the molecular level in the resin matrix.

The polymerizable monomer that forms the resin matrix is not particularly limited as long as it is a monomer having one carbon-carbon double bond with polymerizability in a molecule. For example, the polymerizable monomer may include (meth)acrylate derivatives such as (meth)acrylic acid, maleic acid, fumaric acid, itaconic acid, crotonic acid, (poly)ethylene glycol (meth)acrylate, (poly)propylene glycol (meth)acrylate, (poly)glycerin (meth)acrylate, and so on; (meth)acrylamide derivatives such as (meth)acrylamide, N-methyl (meth)acrylamide, N-ethyl (meth)acrylamide, N-propyl (meth)acrylamide, N-butyl (meth)acrylamide, N,N-dimethyl (meth)acrylamide, diacetone acrylamide, N,N-dimethylaminopropyl (meth)acrylamide, t-butyl acrylamide sulfonic acid, and so on, and salts thereof; N-vinyl amide derivatives such as N-vinylpyrrolidone, N-vinylformamide, and N-vinylacetamide; sulfonic acid monomers such as vinyl sulfonic acid, allylsulfonic acid, and so on, and salts thereof. In addition, (meth)acrylic means acrylic or methacrylic.

As the crosslinking monomer that crosslinks by polymerization with the polymerizable monomer, it is preferable to use a monomer having two or more double bonds with polymerizability in a molecule. Specifically, examples of the crosslinking monomer may include polyfunctional (meth)acrylamide monomers such as methylene bis(meth)acrylamide, ethylene bis(meth)acrylamide, N,N-methylene bisacrylamide, and N-methylolacrylamide, and so on; polyfunctional (meth)acrylate monomers such as (poly)ethylene glycol di(meth)acrylate, (poly)propylene glycol di(meth)acrylate, glycerin di(meth)acrylate, glycerin tri (meth)acrylate, and glycidyl (meth)acrylate, and so on; tetra allyloxy ethane; diallyl ammonium chloride, and the like. Of these, the multifunctional (meth)acrylamide monomers are preferable, and N,N-methylene bisacrylamide is more preferable. In addition, it should be noted that these cross-linking monomers may be used alone or in combinations of two or more thereof.

The content of the cross-linkable monomer is preferably 0.005 to 10 parts by weight of 100 parts by weight of the resin matrix in which the polymerizable monomer and the cross-linkable monomer are polymerized and cross-linked. When the content of the cross-linkable monomer in the resin matrix is low, there are few network cross-linking points that connect main chains and there are cases in which a gel electrolyte layer having an excellent shape-retaining property is not obtained. When the content of the cross-linkable monomer is high, the number of network cross-linking points that connect the main chains increases, and a gel electrolyte layer having an excellent shape-retaining property is apparently obtained. However, the gel electrolyte layer softens and is prone to be cut or destroyed by a pulling force or compressive force in some cases. Further, due to an increase in the number of cross-linking points, the main polymer chains become hydrophobic and cannot stably hold a solvent such as water sealed in the network structure. Because of this, bleeding may easily occur in some cases.

To increase an ability to hold a solvent or a wetting agent in the gel electrolyte layer or cohesive power, by re-polymerizing a resin matrix polymerized in advance by newly impregnating a polymerizable monomer and a cross-linkable monomer thereinto, a three-dimensional structure obtained by penetrating different resin matrices with each other may be formed. The resin matrix polymerized in advance may be cross-linked or not cross-linked.

As a solvent which is usable in the gel electrolyte layer, a polar solvent with a high boiling point, a low vapor pressure at room temperature, and compatibility with a polymerizable monomer and a cross-linkable monomer is preferred.

Examples of such solvents may include water; alcohols such as methanol, ethanol, isopropanol, and so on; cellosolves such as methyl cellosolve, ethyl cellosolve, butyl cellosolve, and so on; amides such as N,N-dimethylformamide, N,N-dimethylacetamide, N,N'-dimethyl-2-imidazolidinone, N-methyl-2-pyrrolidone, and so on; sulfones such as sulfolane, and so on; and sulfoxides such as dimethyl sulfoxide, and so on. These solvents may be mixed to be used.

Preferably, the solvent contained in the gel electrolyte layer is 5 to 50 wt %, and more preferably 5 to 40 wt %. Below this range, excellent conductivity cannot be obtained since flexibility of the gel electrolyte layer is low and electrolytic salt can hardly be added. Further, above this range, bleeding and the like of a solvent may occur in some cases since the equilibrium solvent retention amount of the gel electrolyte layer is greatly exceeded. Further, physical properties may greatly change with time in some cases due to leakage of a solvent which is not retained.

The moisture of the concrete layer 3 and the solvent are common when the gel electrolyte layer used in the electrolyte layer 12 is a hydrogel layer in which water and an electrolytic salt are held in a hydrophilic resin matrix as solvents and preferably a wetting agent is further held. In this aspect, the hydrogel layer is preferable since it is easy for ionic conduction to occur at an interface between the concrete layer 3 and the electrolyte layer 12.

The hydrogel layer is capable of holding the electrolytic salt in a state in which it is dissolved in water at the molecular level in the resin matrix. That is, a charge transfer speed is accelerated by the electrolytic aqueous solution, and thus flexibility and adhesiveness can be easily applied to the hydrogel layer.

The water content of the hydrogel layer used in the electrolyte layer 12 is usually 5 to 50 wt %, and preferably 10 to 30 wt %. When the water content is low, the flexibility of the hydrogel layer is degraded in some cases. Further, ionic conductivity is lowered and thus an ability to transfer charges is inferior in some cases. When the water content of the hydrogel layer is high, an amount of moisture that exceeds an amount of moisture capable of being held by the hydrogel layer may be separated or dried. Because of this, the hydrogel layer may shrink or physical properties such as ionic conductivity thereof may greatly change in some cases. In addition, when the moisture content of the hydrogel layer is high, the hydrogel layer may be too flexible and the shape-retaining property thereof may be inferior in some cases.

The content of the electrolytic salt in the hydrogel layer is preferably 0.01 to 20 wt %, and more preferably 0.1 to 10 wt %. Above this range, it may be difficult for the electrolytic salt to be completely dissolved in water. Because of this, the electrolytic salt may be deposited as crystals in the hydrogel layer or inhibit dissolution of the other components in some cases. Below this range, ionic conductivity may be inferior in some cases.

When a wetting agent is included in the hydrogel layer used in the electrolyte layer 12, a decrease in the water content of the hydrogel layer may be suppressed. In view of adhesiveness and shape-retaining property, the wetting agent is preferably adjusted to be in a range of about 5 to 80 wt % and more preferably 20 to 70 wt %. When the content of the wetting agent in the hydrogel layer is low, moisture-retaining power of the hydrogel layer becomes poor, and moisture may easily evaporate. Because of this, adhesiveness may decrease due to lack of long-term stability or flexibility of the hydrogel layer in some cases. When the content of the wetting agent is high, handleability may decrease due to viscosity being too high when the hydrogel layer is being manufactured, and bubbles may be mixed when the hydrogel layer is being formed in some cases. Further, the relative content of the resin matrix and water decreases, and thus there are concerns of decreasing a shape-retaining property or ionic conductivity.

The wetting agent is not particularly limited as long as it improves holding power of the solvent. For example, the wetting agent may include polyhydric alcohols such as ethylene glycol, propylene glycol, butanediol, glycerin, pentaerythritol, sorbitol, and so on; polyols in which one or more of the polyhydric alcohols are polymerized as monomers; and saccharides such as glucose, fructose, sucrose, lactose, and so on. The wetting agent may be used alone or in combination of two or more kinds. Also, a functional group such as an ester bond, an aldehyde group, a carboxyl group, and so on; and so on may be included in molecules of polyhydric alcohols or at terminals of the molecules.

Of these, the polyhydric alcohols are preferable since the polyhydric alcohols give elasticity to the hydrogel layer in addition to an action of holding moisture. Of the polyhydric alcohols, glycerin is particularly preferable in view of a long term water retaining property. Polyhydric alcohols may be used by selecting one or more therefrom. Of the polyhydric alcohols, those which are liquid at room temperature are more preferable because those are excellent at elasticity improvement of the hydrogel layer and at handleability during manufacturing of the hydrogel layer. When the elasticity of the hydrogel layer needs to be increased, known fillers such as titanium oxide, calcium carbonate, talc, and so on may also be added.

The electrolytic salt contained in the hydrogel layer used in the electrolyte layer 12 is not particularly limited as long as ionic conductivity can be given to the hydrogel layer. The electrolytic salt may be freely selected from electrolytic salts which are commonly used for transferring charges. For example, the electrolytic salt may include: halogenated alkaline metal salts including sodium halides such as NaCl, and so on, potassium halides such as KCl, and so on, and so on, halogenated alkaline earth metal salts such as magnesium halides, calcium halides, and so on, other metal halides such as LiCl, and so on; inorganic salts including various metal sulfates such as $K_2SO_4$, $Na_2SO_4$, and so on, nitrates, phosphates, chlorates, perchlorates, hypochlorites, chlorites, ammonium salts, fluorine-containing electrolytic salts such as $LiPF_6$, $LiBF_4$, LiTFSI, and so on, various complex salts, and so on; monovalent organic carboxylates such as acetic acid, benzoic acid, lactic acid, tartaric acid, and so on; monovalent salts or divalent salts or salts with higher valence including polycarboxylic acids such as phthalic acid, succinic acid, adipic acid, citric acid, and so on; metal salts of organic acids such as sulfonic acid, amino acids, and so on; organic ammonium salts; and salts of a polymer electrolyte such as poly(meth)acrylic acid, polyvinyl sulfonic acid, poly t-butylacrylamide sulfonic acid, polyallylamine, polyethylene imine, and so on; and so on. Even in an insoluble or dispersed state when the hydrogel layer is being manufactured, electrolytic salts which are dissolved in the hydrogel layer with time may also be used. These include silicates, aluminates, metal oxides, metal hydroxides, and so on.

The hydrogel layer used for the electrolyte layer 12 becomes capable of conducting ions when an electrolyte is included therein and thus transfer of charges is possible, but the transfer of charges is further facilitated when a redox agent is further included therein. Examples of such redox agent may include organic ones such as a quinone-hydroquinone mixture, and so on or inorganic ones such as $S/S^{2-}$, $I_2/I^-$, and so on. Further, iodine compounds such as metal iodides such as LiI, NaI, KI, CsI, $CaI_2$, and so on; quaternary ammonium compounds including such as tetraalkylammonium iodides, pyridinium iodide, imidazoline iodide, and so on; and so on can also be properly used.

Further, in order to adjust the pH of the hydrogel layer, the hydrogel layer may also include alkalis such as NaOH, KOH, and so on.

Examples of a method for manufacturing the hydrogel layer used for the electrolyte layer 12 may include, for example, a method in which a polymerizable monomer, a cross-linkable monomer, a wetting agent, a polymerization initiator, and an electrolytic salt are mixed and the mixture is dissolved or dispersed in water for cross-linking and polymerizing, a method in which an electrolytic salt is impregnated into a resin matrix obtained by dissolving or dispersing a polymerizable monomer, a cross-linkable monomer, a wetting agent, and a polymerization initiator in water and cross-linking and polymerizing, and a method in which a crosslinking agent is added to a dispersed liquid in which an electrolyte is dissolved or dispersed in a straight-chain polymer polymerized by only the polymerizable monomer dispersed in water in the presence of a wetting agent to perform a crosslinking reaction between the straight-chain polymer and the crosslinking agent to form a resin matrix.

An antiseptic agent, an antifungal agent, a rust inhibitor, an antioxidant, a stabilizer, a surfactant, a coloring agent, and so on may be properly added to the hydrogel layer used for the electrolyte layer 12 as needed.

A known method may be employed as a method of laminating the electrolyte layer 12. The method of laminating the electrolyte layer 12 may include a method of applying the electrolyte layer 12 on the conductive layer 11 using a coating method such as gravure coating, bar coating, screen coating, and so on.

A hydrogel layer formed on a sheet in advance may also be used as the electrolyte layer 12.

In this case, since the hydrogel layer has adhesiveness, the hydrogel layer can be adhered to the conductive layer 11 as it is. This method is preferred when the conductive layer 11 wound around a roll and the hydrogel layer wound around a roll are used to continuously produce the corrosion protection anode 10.

When the conductive layer 11 is cut into a single wafer, the polymerizable monomer, crosslinkable monomer, a wetting agent, a polymerization initiator, and an electrolytic salt are dissolved or dispersed in water to be applied on the conductive layer 11 to form a sol-like electrolyte layer, and after that gelated by radical polymerization.

In the corrosion protection anode 10 in this embodiment, a hydrogel layer formed on a sheet in advance is used as the electrolyte layer 12.

When the hydrogel layer is used for the electrolyte layer 12, to prevent evaporation of water through the exposed surface outside thereof or attachment of dust or foreign substances due to adhesive power, an impermeable release paper is preferably laminated on an exposed surface. Generally, since hydrogel layers on the market have impermeable release papers laminated on both sides thereof, they can be used without change.

The impermeable release paper may be formed by applying a release agent such as silicone on a resin film, but there is concern of the release agent moving to a surface of the hydrogel layer. Meanwhile, since the hydrogel layer is separably adhered to polyolefins such as polyethylene, polypropylene, and so on, a polyolefin film is preferably laminated as a release paper without change.

In the corrosion protection anode 10 according to the embodiment, the reinforcing layer 14 formed of a nonwoven fabric is laminated on a surface to which the electrolyte layer 12 of the conductive layer 11 is not adhered.

The reinforcing layer 14 is a layer that reinforces to allow easy handling of a graphite sheet which needs to be carefully handled to prevent damage or destruction that occurs in some cases due to handling methods. Particularly, in the conductive layer 11 of the corrosion protection anode 10 according to the embodiment, since the graphite sheet made using the expanding method which is inexpensive but in which separation between pieces of flaky graphite may easily occur is used, reinforcing the graphite sheet with the reinforcing layer 14 is important. Using a nonwoven fabric as the reinforcing layer 14 is preferable since the graphite sheet which is prone to breakage can be reinforced by a high tear strength of the nonwoven fabric.

To deal with a case in which a large current is flowed to prevent corrosion of the object to be protected from corrosion 4 in which corrosion is in progress, the reinforcing layer 14 of the corrosion protection anode 10 of the present invention also serves as an air permeable layer that discharges gas generated during corrosion protection.

Consequently, fiber base materials in which fibers such as glass fibers, animal fibers, plant fibers, synthetic resin fibers, and so on are processed into sheets such as a woven fabric, a nonwoven fabric, a knitted fabric, a paper, and so on may be used as the reinforcing layer 14. Of the fiber base materials, a fiber base material formed of synthetic resin fibers is preferable since it has excellent tear strength and high corrosion resistance.

The fiber base material is preferably processed into a nonwoven fabric because, in this case, the fiber base material has gas permeability in a vertical direction and a horizontal direction and a thickness or a gap thereof can be easily selected. Further, since the thickness and the gas permeability can be secured, the tear strength is high.

Figure 3:
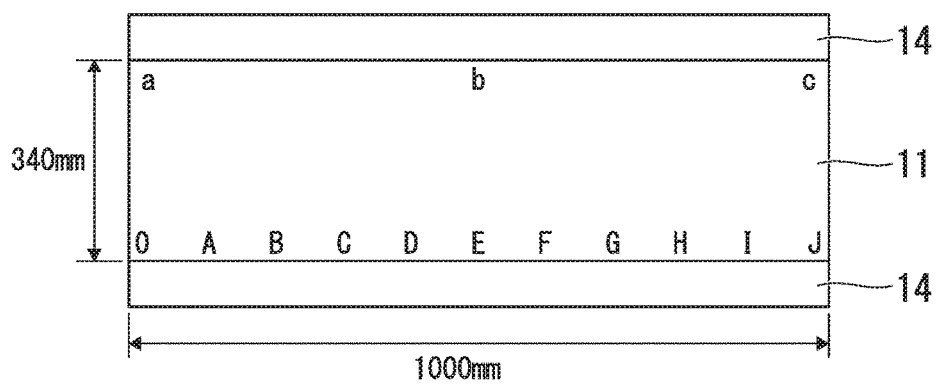
FIG. 3 is a plan view of a step of laminating a reinforcing layer on a conductive layer in manufacturing a corrosion protection anode and a view showing a method of measuring a resistance value of the conductive layer using the same according to a first embodiment of the present invention.

As shown in FIG. 3, the reinforcing layer 14 preferably has a wider width than the conductive layer 11 and is laminated on the conductive layer 11 leaving margins at both sides. Thus, when the corrosion protection anode 10 is manufactured, stored or installed, it is difficult for another object to inadvertently come into contact with an end surface of the conductive layer 11. Consequently, since the conductive layer 11 can be prevented from being torn or broken, the conductive layer 11 can be reliably reinforced. Also, the margins are preferably held when the corrosion protection anode 10 is manufactured or installed because the conductive layer 11 or the electrolyte layer 12 is not damaged in this way. The width of the margins is not particularly limited.

When a protective layer 15 to be described below is laminated on the reinforcing layer 14, gases generated during corrosion protection are discharged through the protective layer 15. When permeation of gases through the protective layer 15 is not sufficient, gases may also be discharged from an end surface of the reinforcing layer 14. In this case, since the end surface of the reinforcing layer 14 is thin, it is prone to blockage by dust. When the width of the reinforcing layer 14 is wider than that of the conductive layer 11, a portion of the reinforcing layer 14 not laminated on the conductive layer 11 becomes a gas permeation hole and thus the gas permeation hole is not easily blocked.

Examples of the resin constituting the synthetic resin fiber that serves as a fiber base material include polyester resins such as polyethylene terephthalate (PET), polyethylene naphthalate (PEN), and so on, fluorine-based resins such as polytetrafluoroethylene (PTFE), ethylene-tetrafluoroethylene copolymer (ETFE), and so on, and acrylic resins, polyolefin resins such as polyethylene (PE), polypropylene (PP), and so on, polyamide resins such as nylon, and so on, tetraacetyl cellulose (TAC), polyester sulfone (PES), polyphenylene sulfide (PPS), polycarbonate (PC), polyarylate (PAr), polysulfone (PSF), polyetherimide (PEI), polyacetal, polyimide, polyether sulfone, and so on.

Of the resins, the polyolefin resins such as PE, PP, and so on are preferable due to their high corrosion resistance, ease of acquisition, and advantages in terms of cost.

The corrosion protection anode 10 according to the embodiment uses a nonwoven fabric formed of PP as the reinforcing layer 14. The nonwoven fabric is laminated on the conductive layer 11 by dry lamination using an adhesive.

Generally, when a graphite sheet is being reinforced, a thermoplastic resin layer is thermally pressed and laminated. This is because an unnecessary layer is not interposed between the graphite sheet and the thermoplastic resin. However, in the present invention, thermally pressing the fiber base material formed of a thermoplastic resin is not preferable since, in this case, gas permeability in a vertical direction and a horizontal direction is inhibited.

Meanwhile, in the dry lamination, since an adhesive is applied using a gravure roll, gas permeability is not inhibited. When there is concern of gas permeability in the vertical direction being inhibited by the adhesive layer 13, an amount of adhesive being applied may be easily adjusted by decreasing the applied amount. According to circumstances, the adhesive may also be applied in drops or in a grid pattern.

In the corrosion protection anode 10 according to the embodiment, the protective layer 15 which is impermeable is laminated on the reinforcing layer 14. The protective layer 15 is disposed on a surface of the corrosion protection anode 10 to block water or air and prevent contamination, degradation, damage, ingress of moisture, and blockage of the conductive layer 11, the electrolyte layer 12, and the reinforcing layer 14. Consequently, the protective layer 15 is preferably formed to cover entire surfaces of the conductive layer 11, the electrolyte layer 12, and the reinforcing layer 14. Further, when the reinforcing layer 14 has a wider width than the conductive layer 11 as shown in FIG. 3, the protective layer 15 preferably covers the entire surfaces of the conductive layer 11 and the electrolyte layer 12, but does not have to cover the entire surface of the reinforcing layer 14.

The protective layer 15 may laminate a resin layer by dry lamination, extrusion lamination, or sandwich lamination in which a film is laminated by an extruded resin as an adhesive layer.

Due to excellent antifouling properties and weather resistance, fluorine-based resins such as polyvinylidene fluoride (PVDF), polytetrafluoroethylene (PTFE), ethylene-tetrafluoro ethylene copolymer (ETFE), and so on, epoxy resins, and acrylic resins such as methyl methacrylate (MMA), and so on are suitable for the resin for forming the protective layer 15. Other than these, examples of the resin may also include resins such as polyesters such as polyethylene terephthalate (PET), polyethylene naphthalate (PEN), and so on, tetraacetyl cellulose (TAC), polyether sulfone (PES), polyphenylene sulfide (PPS), polycarbonate (PC), polyarylate (PAr), poly sulfone (PSF), polyetherimide (PEI), polyacetal, polyimide, polyether sulfone, and so on.

Of these resins, the fluorine-based resins are preferable due to their excellent antifouling properties and weather resistance and permeability with respect to gases such as oxygen or chlorine generated when corrosion protection is performed by flowing a current of approximately 10 mA to 30 mA even when a plurality of holes are not provided.

The thickness of the protective layer 15 is preferably thin in view of permeability of gases such as oxygen and chlorine generated during corrosion protection and cost as long as a physical strength is satisfactory. Specifically, the thickness of the protective layer 15 is selected from a range of 10 to 200 μm, and more preferably from a range of 20 to 100 μm. The protective layer 15 may also be laminated with a plurality of homogenous or heterogeneous resins.

The protective layer 15 may be colorized or may include a design such as text information, figures, and so on. Particularly, the protective layer 15 is preferably colorized in a grayish color which is similar to the color of the surface of the concrete layer 3 so that the corrosion protection anode 10 is inconspicuous.

A masking film having an adhesive layer is preferably laminated on the protective layer 15 so that contamination and damage do not occur due to the corrosion protection anode 10 being provided on the concrete layer 3 in this way.

The object to be protected from corrosion 4 to which the corrosion protection anode 10 is properly applied includes not only materials including iron such as steel materials and so on but also materials including nickel, titanium, copper, and zinc, and corrosion protection thereof is also possible.

Even when the object to be protected from corrosion 4 is buried in the concrete layer 3, corrosion protection thereof is possible. A gel state substance including moisture is present in a very small gap of the concrete layer 3. $OH^-$, $Na^+$, $Ca^{2+}$, $K^+$, and so on are main ions included in the gel state substance. Further, NaCl is injected into a concrete layer of a structure located close to the sea which is in great need of corrosion protection.

The concrete layer 3 is a solid electrolyte layer with large impedance and functions as a layer having ion conductivity due to the ions. In addition, since the concrete layer 3 releases moisture in the air by drying or absorbs moisture in the air due to rainwater or daily temperature changes, the concrete layer 3 is not in a completely dried condition.

In addition, the corrosion protection anode 10 of the present invention can also be applied to the object to be protected from corrosion 4 having a pigment film formed on a surface thereof. Although such a pigment film may appear to be an insulating layer, there are a plurality of cracks or fine holes through which ingress of moisture can cause corrosion in a surface of the film. The cracks or fine holes penetrate through the object to be protected from corrosion. Since moisture or air cannot be blocked from portions with cracks or fine holes, there is moisture therein.

Consequently, the portions with the cracks or fine holes become capable of conducting ions due to ions being able to move through the portions with the cracks or fine holes. Thus, corrosion protection is possible by adhering the corrosion protection anode 10 of the present invention to the pigment film. In addition, since the corrosion protection is performed at the portions with the cracks or fine holes, the corrosion protection is performed for a very narrow area. Consequently, corrosion protection can be very efficiently performed even when an amount of electrons supplied from the corrosion protection anode 10 to the portions with the cracks or fine holes is small.

When corrosion protection of the object to be protected from corrosion 4 having a pigment film is performed and a hydrogel layer is used as the electrolyte layer 12, a portion of the hydrogel layer enters the cracks or fine holes on the surface of the pigment film and thus comes into contact with or comes very close to the object to be protected from corrosion. Thus, corrosion protection of the object to be protected from corrosion 4 having the pigment film can be reliably performed.

In addition, the hydrogel layer includes a resin matrix. Thus, when corrosion protection of a metal having a pigment film is performed, a short circuit does not occur even when the corrosion protection anode 10 is directly brought into contact with a surface of a metal which is an object to be protected from corrosion since the conductive layer 11 does not come into contact with the metal.

Consequently, corrosion protection of a metal which is an object to be protected from corrosion may be performed by directly bringing the corrosion protection anode 10 into contact with a peeled-off surface of the metal or bringing the corrosion protection anode 10 into contact with a surface layer formed of an ion-permeable oxide film such as rust and so on present on the surface of the metal.

In the concrete structure corrosion protection structure 1 according to the embodiment, the corrosion protection anode 10 is adhered to the surface layer 3 of a concrete structure using the electrolyte layer 12, the conductive layer 11 of the corrosion protection anode 10 is connected to the positive electrode of the external power supply 5, and the negative electrode of the external power supply 5 is connected to the object to be protected from corrosion 4 using the wiring circuit 6.

The wiring circuit 6 preferably has corrosion resistance to anodic dissolution. Examples of the wiring circuit 6 may include carbon, titanium, stainless steel, platinum, tantalum, zirconium, niobium, nickel, and nickel alloys such as Monel, Inconel, and so on. Of these, titanium is preferable because it is easily acquired and has resistance to anodic dissolution throughout a wide range of potentials.

Alternatively, even when a wiring circuit 6 is an aluminum wire, a copper wire, etc. without resistance to anodic dissolution, the wiring circuit 6 may be used by being coated with a resin layer.

When the corrosion protection anode 10 is connected to a circuit such as a power supply, and so on, the wiring circuit 6 is preferably connected to current discharge points (e.g., terminals) provided at one or two or more places of corner portions of the conductive layer 11 of the corrosion protection anode 10, and the corrosion protection anode 10 is connected to the circuit such as a power supply, and so on.

The current discharge points that connect to the circuit such as a power supply and so on may bond the wiring circuit 6 to the conductive layer 11 using a conductive adhesive, but a terminal is preferably used. A crimping terminal capable of crimping the wiring circuit 6 is more preferable as the terminal. In addition, preferably, the crimping terminal has sharp metal teeth and the teeth are capable of cutting into the conductive layer 11 since, in this way, work is easy and thus electrical connection can be reliably obtained. The wiring circuit 6 is crimped by the crimping terminal so that the teeth of the crimping terminal cut into both of the conductive layer 11 and the reinforcing layer 14. Thus, since the reinforcing layer 14 formed of a fiber base material of a synthetic resin has high tear strength, the crimping terminal is firmly fixed. Thereby, at a portion at which the crimping terminal crimps the wiring circuit 6, it is preferable that at least the reinforcing layer 14 be laminated on the conductive layer 11. In addition, at this portion, the protective layer 15 may be further laminated on the reinforcing layer 14 laminated on the conductive layer 11.

As an example of the crimping terminal, a product named TERMI-FOIL is being sold by Tyco Electronics Japan G.K. (formerly, AMP Inc., Tyco Electronics Corporation).

Figure 6:
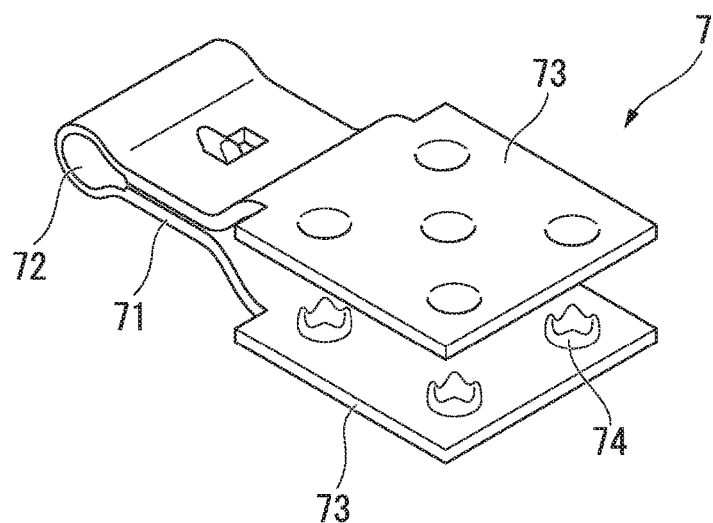
FIG. 6 is a perspective view showing an example of a crimping terminal used in a concrete structure corrosion protection structure of the present invention.

In FIG. 6, an example of a crimping terminal 7 is shown. In the crimping terminal 7, sharp metal teeth 74 referred to as "lances" are arranged in a predetermined pattern to face each other at both of two metal plates 73 (e.g., tinned copper plates) each having four sides of approximately 10 mm. A conducting wire crimping part 71 is connected to the two metal plates 73 so that the conducting wire crimping part 71 may be opened and closed by a connection part 72. A conducting wire 6 is crimped by the conducting wire crimping part 71 so that the protective layer 15, the reinforcing layer 14, and the conductive layer 11 are placed between the lances 74 of the two metal plates 73 and are pressed down with pliers and a hammer, and so on. Thus, the lances 74 tear up the protective layer 15 and the reinforcing layer 14, and the lances 74 cut into the conductive layer 11. Further, since the lances 74 are arranged within a surface of the metal plate 73, portions surrounding a place at which the conductive layer 11 is cut into by the lances 74 are covered by the metal plate 73. Thereby, the conductive layer 11 is reliably connected to the conducting wire 6, and a connection part is protected with the metal plate 73. In addition, since the crimping terminal 7 is firmly fixed by the reinforcing layer 14, the crimping terminal 7 is not detached from the conductive layer 11 formed of a graphite sheet prone to breakage.

In addition, when the crimping terminal 7 comes into contact with the electrolyte layer 12, the crimping terminal 7 is prone to corrosion because the crimping terminal 7 also functions as an anode. Consequently, when the crimping terminal 7 comes into contact with the electrolyte layer 12, the electrolyte layer 12 at a portion which serves as a current discharge point is preferably cut off or the electrolyte layer 12 is not laminated in advance.

Further, for connection of the crimping terminal 7, the conducting wire 6 may be crimped by the conducting wire crimping part 71 of the crimping terminal 7 after the metal teeth 74 of the crimping terminal 7 are made to cut into the conductive layer 11 together with the protective layer 15 and the reinforcing layer 14.

Further, in the crimping terminal 7 shown in FIG. 6, although each of the two metal plates 73 have five (one at the center and four at corners) lances 74 (grooves at the other side of the lances 74 are shown for the metal plate 73 at an upper side), the number and arrangements of the metal teeth 74 may be properly changed.

Figure 2:
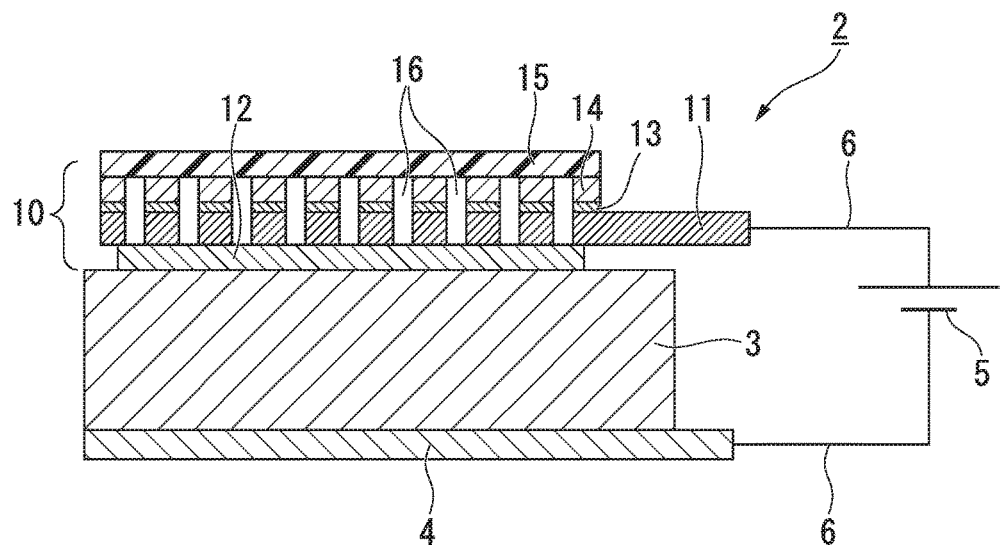
FIG. 2 is a cross-sectional view showing another example of a corrosion protection anode according to the present invention and another example of a concrete structure corrosion protection structure using the same.

In FIG. 2, a second embodiment of the corrosion protection anode 10 and an example of a concrete structure corrosion protection structure using the same are schematically shown. In FIG. 2, the reference numeral 16 represents through-holes.

To deal with a case in which gas generated during corrosion protection by a large current is discharged, a plurality of through-holes 16 are provided at the conductive layer 11 used in the corrosion protection anode 10 of the embodiment.

The only difference between the first embodiment and the second embodiment of the corrosion protection anode 10 is that the conductive layer 11 in FIG. 2 includes the through-holes 16. Other elements marked with the same reference numerals as in FIG. 1 represent the same elements in FIG. 2, and thus descriptions thereof will be omitted.

When the graphite sheet manufactured by the expanding method or the polymer film thermal decomposition method is used as the conductive layer 11 used in the present invention, it may be difficult for gases to permeate in some cases. However, generally, when a small voltage of 2 V or less is applied during corrosion protection, an amount of gas being generated is very small and thus there is no practical problem even when gas permeability is low.

However, when a current amount capable of desalination or re-alkalization is required for protecting from corrosion of a reinforcing bar in which corrosion is in progress, gases generated during corrosion protection should be discharged.

Alternatively, even when a graphite sheet to which short carbon fibers are bound by a carbide resin is used in the conductive layer 11, the through-holes 16 may be provided when higher gas permeability is required.

When the through-holes 16 are provided, it is preferable that after the reinforcing layer 14 is laminated on the conductive layer 11 the two are perforated together so that the conductive layer 11 is not damaged. Consequently, in the embodiment, the through-holes 16 are provided at both of the conductive layer 11 and the reinforcing layer 14. Here, the through-holes 16 may not penetrate the fiber base material of the reinforcing layer 14 and may only perforate up to the middle thereof.

Known methods such as punching, laser beams, perforation using a needle, and so on may be employed for forming the through-holes 16. Compared to perforating using a needle, although a hole with a relatively large diameter is obtained by punching, punching waste is generated. Although perforation using laser beams is capable of freely setting a perforation state, an apparatus therefor is expensive. Consequently, perforation using a needle which does not generate punching waste together with an inexpensive apparatus is preferable.

In the perforation using a needle, the perforation is preferably performed from the side of a graphite sheet. When the perforation is performed from the side of the reinforcing layer 14, surrounding portions of a hole irregularly cleave, and the cleft pieces rise up to a surface of a graphite sheet. When the cleft pieces which have risen up come into contact with other items, the graphite sheet, particularly the graphite sheet made using the expanding method, used in the embodiment may be broken in some cases due to low tear strength. Further, even when the graphite sheet is not broken, since a stress for returning to the original state remains in the cleft pieces, the through-holes 16 are prone closure.

Meanwhile, when the perforation is performed from the side of the graphite sheet, the cleft pieces rise up as above. However, in this case, the through-holes 16 are not easily closed since surrounding portions of the cleft pieces are entangled with fibers of a fiber base material of the reinforcing layer 14.

In addition, in the perforation using a needle, using a thermal needle is preferable even when perforating from the side of the graphite sheet.

In the perforation using a thermal needle, the graphite sheet is unable to melt even when the perforation is performed from the side of the graphite sheet, but the fiber of the fiber base material may melt.

When the fiber of the fiber base material melts during the perforation, since the surrounding portions of the cleft pieces are welded while entangled with the fibers of the fiber base material of the reinforcing layer 14, it becomes more difficult for the through-holes 16 to close.

The shape of the through-holes 16 is not particularly limited as long as gases are permeable therethrough.

The density of the through-holes 16 is related to an amount of gas generated during corrosion protection and the size of the through-holes 16. In view of this point, the density of the through-holes 16 is preferably checked by conducting a preliminary test. In point of the size of the through-holes 16, generally, when the shape of the through-holes 16 is circular, a diameter of the through-holes 16 is in an approximate range of 0.1 to 1 mm. When the size of the through-holes 16 is below this range, the through-holes 16 are prone to blockage and cannot be able to smoothly discharge generated gases in some cases. When the size of the through-holes 16 is above this range, punching using a punch is employed so that care is required in treating punching waste.

Hereinafter, the present invention will be described in detail based on examples.

The corrosion protection anode 10 according to the first embodiment is manufactured in the following sequence.

The reinforcing layer 14 was laminated using dry lamination on the conductive layer 11. The reinforcing layer 14 was formed of a nonwoven fabric of PP having a thickness of approximately 0.25 to 0.3 mm, mass per unit area of 50 g/m$^2$, a width of 460 mm, and a length of 1000 mm. The conductive layer 11 was formed of the graphite sheet manufactured by the expanding method having a thickness of 0.125 mm, a width of 340 mm, and a length of 1000.

The obtained laminated body of the conductive layer 11 and the reinforcing layer 14 was perforated using a thermal needle from the side of the conductive layer 11 to form the plurality of through-holes 16 at the conductive layer 11 and the reinforcing layer 14.

Dry lamination of a polyfluorovinyl film having a thickness of 40 µm and a width of 460 mm and combined with a pigment to be colored in gray was performed on a surface of the conductive layer 11 on which the reinforcing layer 14 was not laminated to form the protective layer 15. During the dry lamination, an adhesive was gravure-coated in the form of drops.

As the electrolyte layer 12, a hydrogel sheet having a thickness of about 0.8 mm, a width of about 300 mm, and a length of 1000 mm (Sekisui Plastics Co., Ltd. "Technogel AG") was used. On both surfaces of the sheet, different masking films each formed of PE and PET were laminated. Only the masking film of PET of the electrolyte layer 12 was peeled off, and the masking film of PE was not peeled off but left as a masking film of the electrolyte layer 12. The exposed surface of the electrolyte layer 12 was overlapped and adhered to a surface of the conductive layer 11 of the corrosion protection anode 10 so that margins at both sides of the conductive layer 11 were equal to each other. In this way, the first embodiment of the corrosion protection anode 10 shown in FIG. 2 was manufactured.

In the step in which the reinforcing layer 14 was laminated on the conductive layer 11, an actual resistance value of the conductive layer 11 of the corrosion protection anode 10 according to the first embodiment was measured. When the resistance value was measured, an electrode terminal was brought into light contact with a surface of the graphite sheet using a general tester.

In a measurement method, as shown in FIG. 3, points A to J were set every 100 mm along one side (a lower side in FIG. 3) of the conductive layer 11 from an origin O of a corner portion that represented a portion at which the current discharge point of the conductive layer 11 is to be provided. Also, points a, b, and c were set along the opposite side (an upper side in FIG. 3) of the conductive layer 11 at positions respectively facing the points O, E, and J. Then, resistance values between two points were measured.

Locations at which resistance values were actually measured were longitudinal in-between portions every 100 mm from O-A to O-J and in-between portions of O-a, O-b, O-c, and E-b which were considered to include width-directional variation factors. The measurement results are shown in Table 1.

TABLE 1

| Resistance-measured portion | Resistance value |
| --- | --- |
| O-A | 1.6 Ω |
| O-B | 1.7 Ω |
| O-D | 1.7 Ω |
| O-E | 1.8 Ω |
| O-F | 1.6 Ω |
| O-G | 1.6 Ω |
| O-H | 1.7 Ω |
| O-I | 1.6 Ω |
| O-J | 1.7 Ω |
| O-a | 1.6 Ω |
| O-b | 1.6 Ω |
| O-c | 1.8 Ω |
| E-b | 1.5 Ω |

According to Table 1, the resistance values in all of the in-between portions are 2Ω or less, and a difference between the maximum value and the minimum value is 0.3Ω. From this point, it was confirmed that a horizontal resistance value of the conductive layer 11 is low, and when the current discharge point is provided at the corner portion, compared with portions close to and distant from the current discharge point, a difference between resistance values of portions close to and distant from the current discharge point is small.

In addition, when the conductive layer 11 is manufactured by a method described in the embodiment of PCT International Publication No. 2013/031663 WO, it is preferable that an electricity feeding material formed of a metal tape such as stainless steel tape, and so on be attached along the conductive layer in the longitudinal direction so that a difference between conduction states at portions close to and distant from the current discharge point of the conductive layer is small. In addition, when the electricity feeding material of a stainless steel tape is actually provided, due to contact resistance or resistance of a conductive adhesive, a resistance value at a distance of 1000 mm is about 4Ω when the same measurement is performed in some cases. From this point, it was confirmed that the electricity feeding material is unnecessary in the conductive layer 11 of the embodiment.

Next, corrosion resistance of the conductive layer 11 of the corrosion protection anode 10 of the first embodiment was reviewed.

Figure 4:
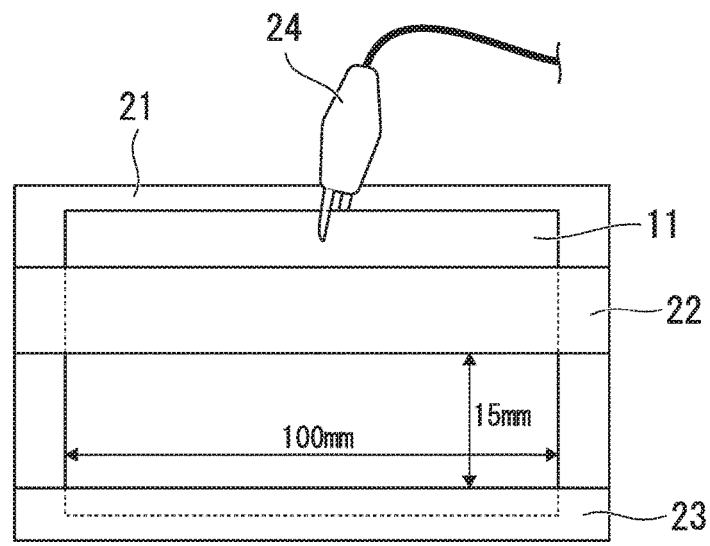
FIG. 4 is a front view of a sample of a constant current conduction test of the conductive layer of the corrosion protection anode according to the first embodiment of the present invention.

A sample of a conduction test shown in FIG. 4 was manufactured in the following sequence to carry out a conduction test of a large current.

Resin adhesive tapes 22, 23 were attached to a lower end and a middle of the conductive layer 11 fixed to a resin plate 21 by an adhesive. A tape was not attached to the upper end of the conductive layer 11 to connect a positive electrode of a power supply thereto using an alligator clip terminal 24.

In this way, a band-shaped exposed portion of 15 mm×100 mm to which a tape was not attached was provided between the tape 22 at the lower end and the tape 23 at the middle.

The sample was dipped in a saturated calcium hydroxide aqueous solution that contained salt at 3% so that the tape 23 in the middle served as a boundary (waterline) between the aqueous solution and air. In addition, in the aqueous solution, a titanium electrode to which platinum connected to a negative electrode of the power supply was coated was dipped to face the sample, and a constant current was flowed therebetween.

The reason for attaching the tape 23 to the portion that served as the waterline was to constantly keep an amount of current per unit area by not changing a contact area between the aqueous solution and the band-shaped exposed part even when a water level of the aqueous solution changed due to an electrolytic reaction. Further, the reason for attaching the tape 22 to a lower end of the sample was to prevent the conductive layer 11 from being peeled off from the resin plate 21.

A constant current was flowed at a current value of 262.4 A/m². The current value is a current amount capable of being conducted for twenty minutes by promoting an integrated current amount (87.6 Ah/m²) when conduction is performed for a year at 10 mA/m². Although influences on the conductive layer 11 of other factors such as changes in temperature, humidity, and so on throughout a long period cannot be taken into consideration, the condition above is considered to be a harsh condition when only corrosion resistance of the conductive layer 11 by conduction of a large current is considered. Changes in voltage when a constant current was applied are shown in FIG. 5.

Figure 5:
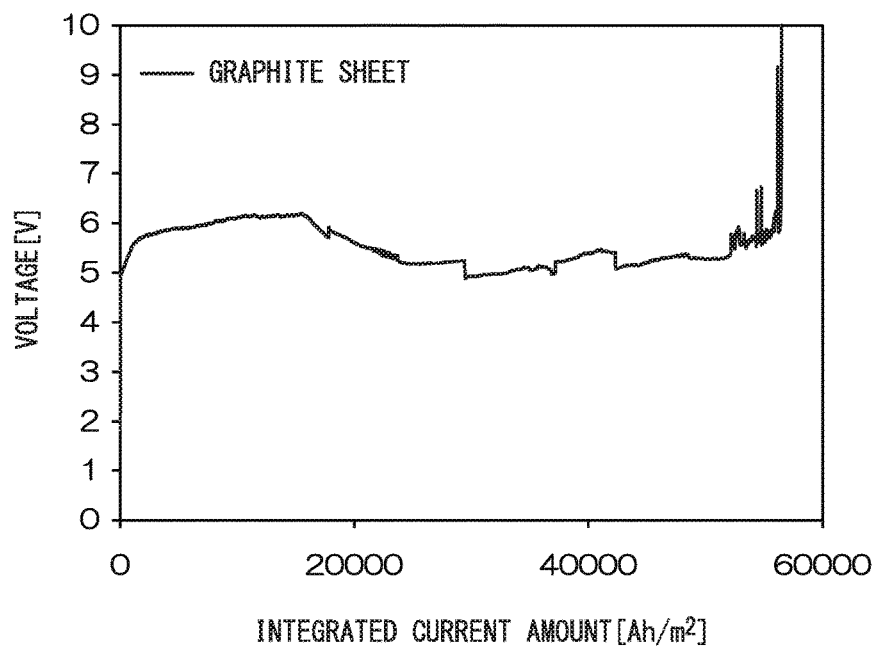
FIG. 5 is a graph showing a result of the constant current conduction test of the conductive layer of the corrosion protection anode according to the first embodiment of the present invention.

According to FIG. 5, the voltage became unstable from near a point at which the integrated current amount exceeded 52,205 Ah/m², and the voltage reached 10 V when the integrated current amount reached 56,511 Ah/m². When this result is converted into years, the amount of time it would take for the voltage to become unstable is 595 years, and the amount of time it would take for the voltage to reach 10 V is 645 years. From this point, it was confirmed that the conductive layer 11 of the corrosion protection anode 10 according to the embodiment has very high corrosion resistance.

The corrosion protection structure 1 according to the first embodiment was manufactured in the following sequence.

The obtained masking film of PE of the electrolyte layer 12 of the corrosion protection anode 10 according to the first embodiment was peeled off, and the exposed surface was adhered to the concrete layer 3 in which a reinforcing bar 4 was buried.

The conducting wire 6 in which a copper wire was covered by a resin layer was crimped by the conducting wire crimping part 71 of the crimping terminal 7 (product name: TERMI-FOIL) shown in FIG. 6 to prepare the conducting wire 6 attached to the crimping terminal 7. At one end of one side of the conductive layer 11 exposed by a width of 20 mm from both sides of the corrosion protection anode 10, the conductive layer 11, the reinforcing layer 14, and the protective layer 15 were placed within the crimping terminal 7. In addition, the two metal plates 73 of the crimping terminal 7 were hammered to make the lances 74 of the crimping terminal 7 to cut into the conductive layer 11. Since the lances 74 cut into both of the conductive layer 11 and the reinforcing layer 14, the corrosion protection anode 10 was firmly fixed and was reliably electrically connected.

In addition, the corrosion protection structure 1 according to the first embodiment shown in FIG. 2 was manufactured by connecting the conducting wire 6 to a positive electrode of a power supply and connecting a negative electrode of the power supply to a reinforcing bar in concrete.

Although the present invention has been described above with reference to the drawings based on the preferred embodiment, the present invention is not limited to the embodiment.

Although a current discharge point is provided at one end of one side of the conductive layer 11 exposed to both sides of the corrosion protection anode 10 in the embodiment, current discharge points may also be provided at one end of each side of the conductive layer 11. In this case, the two current discharge points are preferably provided to face each other with a diagonal line placed therebetween. Further, a current discharge point may also be provided at the center of the conductive layer 11 exposed through a side.

In addition, for the crimping terminal 7 that comes into contact with the conductive layer 11 to connect the conducting wire 6, although one in which the two metal plates 73 are connected so that they are folded and piled up at the conducting wire crimping part 71 is used, one in which the two metal plates are connected so that they are folded and piled up about one side not connected to the conducting wire crimping part as an axis may also be used.

According to the present invention, an amount of work at a construction site can be reduced as much as possible. Also, since a difference between conduction states of portions distant from and close to a current discharge point of a conductive feeding material may be reduced even when an electricity feeding material is not used, a corrosion protection anode in which a conducted voltage is suppressed to be low, an amount of gas generated due to electrolysis of water or a chlorine compound is small, and long-term cathodic protection is possible, and a concrete structure corrosion protection structure and corrosion protection method using the same can be provided.

The invention claimed is:

1. A corrosion protection anode for being connected to an external power supply, comprising:
    a conductive layer formed of a graphite sheet having a first and second surface,
    a reinforcing layer formed of a fiber base material, and laminated through an adhesive layer on the first surface of the conductive layer, and
    an electrolyte layer being an electrolyte-containing resin formed in a sheet shape, including adhesive power such that the electrolyte layer is capable of being adhered to the conductive layer and such that the electrolyte layer is adhered to a surface layer on an object to be protected from corrosion, and adhered to the second surface of the conductive layer by the adhesive power,
    wherein the conductive layer always has a resistance value of 4Ω or less between any two points on the second surface thereof that comes into contact with the electrolyte layer, and
    wherein the reinforcing layer has a width that is wider than a width of the conductive layer and is laminated on the conductive layer leaving margins at both sides of the reinforcing layer.

2. The corrosion protection anode according to the claim 1, wherein the conductive layer has a plurality of through-holes through which a gas is permeable.

3. The corrosion protection anode according to claim 1, wherein an outer surface of the reinforcing layer is covered with an impermeable protective layer.

4. The corrosion protection anode according to claim 1, wherein an outer surface of the electrolyte layer is covered with an impermeable release paper.

5. A concrete structure corrosion protection structure, in which comprising:
    the corrosion protection anode according to claim 1, and
    the external power supply, a positive electrode of which is connected to the conductive layer of the corrosion protection anode, a negative electrode of which is connected to the concrete structure,
    wherein the corrosion protection anode is adhered to a surface of the concrete structure through the electrolyte layer of the corrosion protection anode.

6. The concrete structure corrosion protection structure according to claim 5, wherein the external power supply has a terminal having metal teeth that are configured to cut into at least both of the conductive layer and the reinforcing layer such that the conductive layer is connected to the positive electrode of the external power supply.

7. A concrete structure corrosion protection method using the concrete structure corrosion protection structure according to claim 5, the method comprising:
    applying a voltage between the conductive layer of the corrosion protection anode and the concrete structure to flow a corrosion protection current.

* * * * *